US012763398B2

(12) United States Patent
Gupte et al.

(10) Patent No.: US 12,763,398 B2
(45) Date of Patent: Oct. 13, 2026

(54) TRACTION BATTERY PACK THERMAL MANAGEMENT ASSEMBLY

(71) Applicant: Ford Global Technologies, LLC, Dearborn, MI (US)

(72) Inventors: Parikshit S. Gupte, West Bloomfield, MI (US); Bhaskara Rao Boddakayala, Troy, MI (US); Giriraj Srinivasan, Troy, MI (US); Scott M. Rollins, Highland, MI (US); Dominic Mario Bertolini, Birmingham, MI (US); John Hammack McCormick, Clawson, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 567 days.

(21) Appl. No.: 18/461,614

(22) Filed: Sep. 6, 2023

(65) Prior Publication Data

US 2025/0079557 A1 Mar. 6, 2025

(51) Int. Cl.

*H01M 10/653* (2014.01)
*H01M 10/625* (2014.01)
*H01M 10/647* (2014.01)
*H01M 50/211* (2021.01)
*H01M 50/24* (2021.01)

(52) U.S. Cl.

CPC ....... *H01M 10/653* (2015.04); *H01M 10/625* (2015.04); *H01M 10/647* (2015.04); *H01M 50/211* (2021.01); *H01M 50/24* (2021.01); *H01M 2220/20* (2013.01)

(58) Field of Classification Search

CPC ............. H01M 10/613; H01M 10/625; H01M 10/647; H01M 10/653; H01M 10/6554; H01M 10/658; H01M 2220/20; H01M 50/211; H01M 50/24; H01M 50/249; Y02E 60/10

See application file for complete search history.

(56) References Cited

U.S. PATENT DOCUMENTS

2010/0136396 A1 6/2010 Hermann et al.
2014/0335398 A1 11/2014 Partin et al.
2022/0223961 A1* 7/2022 Kim .................... H01M 50/588
2023/0291026 A1* 9/2023 Yoo ..................... H01M 10/613

FOREIGN PATENT DOCUMENTS

CN 114566750 A 5/2022
WO 2017153691 A1 9/2017

OTHER PUBLICATIONS

Machine Translation CN114566750A (Year: 2022).*

* cited by examiner

*Primary Examiner* — Victoria H Lynch
(74) *Attorney, Agent, or Firm* — David B. Kelley; Carlson, Gaskey & Olds, P.C.

(57) ABSTRACT

A traction battery pack assembly includes an enclosure assembly that provides an interior area and a cell stack within the interior area. The cell stack includes battery cells disposed along a cell stack axis. A thermal management assembly is disposed along the cell stack axis. The thermal management assembly includes thermal blockers secured to a base assembly. The base assembly includes a sandwiched region and at least one projecting region. The sandwiched region is disposed along the cell stack axis and is sandwiched between first and second battery cells. The projecting region is outboard of the sandwiched region relative to the cell stack axis. The thermal blockers are secured to the at least one projecting region of the base assembly.

20 Claims, 5 Drawing Sheets

TRACTION BATTERY PACK THERMAL MANAGEMENT ASSEMBLY

TECHNICAL FIELD

This disclosure relates generally to managing thermal energy within a traction battery pack.

BACKGROUND

A traction battery pack of an electrified vehicle can include groups of battery cells arranged in one or more cell stacks. From time to time, pressure and thermal energy within one or more of the battery cells can increase and cause gas and debris to vent from those battery cells.

SUMMARY

In some aspects, the techniques described herein relate to a traction battery pack assembly, including: an enclosure assembly that provides an interior area; a cell stack within the interior area, the cell stack having a plurality of battery cells disposed along a cell stack axis; and a thermal management assembly disposed along the cell stack axis, the thermal management assembly including a plurality of thermal blockers secured to a base assembly, the base assembly including a sandwiched region and at least one projecting region, the sandwiched region disposed along the cell stack axis and sandwiched between first and second battery cells, the at least one projecting region outboard of the sandwiched region relative to the cell stack axis, the plurality of thermal blockers secured to the at least one projecting region of the base assembly.

In some aspects, the techniques described herein relate to a traction battery pack assembly, wherein the plurality of battery cells include a plurality of pouch-style battery cells.

In some aspects, the techniques described herein relate to a traction battery pack assembly, wherein plurality of thermal blockers include thermal blockers secured to opposing axial sides of the at least one projecting region on a first outboard side of the cell stack.

In some aspects, the techniques described herein relate to a traction battery pack assembly, wherein the plurality of thermal blockers further includes thermal blockers secured to opposing axial sides of the at least one projecting region on an opposite, second outboard side of the cell stack.

In some aspects, the techniques described herein relate to a traction battery pack assembly, further including an adhesive that secures the plurality of thermal blockers to the at least one projecting region of the base assembly.

In some aspects, the techniques described herein relate to a traction battery pack assembly, wherein the adhesive is an adhesive tape.

In some aspects, the techniques described herein relate to a traction battery pack assembly, wherein the base assembly includes a thermal barrier, the adhesive tape include a first piece of tape on a first axial side of the thermal barrier, and a second piece of tape on an opposite, second axial side of the thermal barrier.

In some aspects, the techniques described herein relate to a traction battery pack assembly, wherein the first piece of tape secures at least one thermal blocker from the plurality of thermal blockers to the at least one projecting region on a first outboard side of the cell stack, and secures at least one other thermal blocker from the plurality of thermal blockers to the at least one projecting region on an opposite second outboard side of the cell stack.

In some aspects, the techniques described herein relate to a traction battery pack assembly wherein the base assembly is provided entirely by an adhesive tape.

In some aspects, the techniques described herein relate to a traction battery pack assembly, wherein the thermal management assembly is configured to block vent byproducts expelled from one or more battery cells on a first axial side of the thermal management assembly from moving adjacent battery cells on an opposite, second axial side of the thermal management assembly.

In some aspects, the techniques described herein relate to a traction battery pack assembly, wherein the base assembly is a first material, and the thermal blocker is a second, different material.

In some aspects, the techniques described herein relate to a traction battery pack assembly, wherein the thermal blocker is foam.

In some aspects, the techniques described herein relate to a traction battery pack assembly, wherein the base assembly includes mica.

In some aspects, the techniques described herein relate to a method of managing battery pack thermal energy, including: within an enclosure assembly, supporting thermal blockers that are disposed at opposing sides of a cell stack using a base assembly of a thermal management assembly, the base assembly at least partially sandwiched between a first and a second battery cell of the cell stack.

In some aspects, the techniques described herein relate to a method 14, further including adhesively securing the thermal blockers to the base assembly.

In some aspects, the techniques described herein relate to a method 15, further including securing at least some of the thermal blockers to a first axial side of the base assembly using adhesive tape.

In some aspects, the techniques described herein relate to a method 16, further including securing the first battery cell to the first axial side of the base assembly using the adhesive tape.

In some aspects, the techniques described herein relate to a method 17, further including securing some of the thermal blockers and the second battery cell to an opposite second side of the base assembly using adhesive tape.

In some aspects, the techniques described herein relate to a method 14, wherein the base assembly is an adhesive tape.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details exemplary thermal management assemblies for a traction battery pack. The thermal management assemblies can help to, among other things, secure battery cells together and help guide vent byproducts during a thermal event. The thermal management assemblies can include a plurality of thermal blockers. Thus, a separate installation of thermal blockers may not be required.

Figure 1:
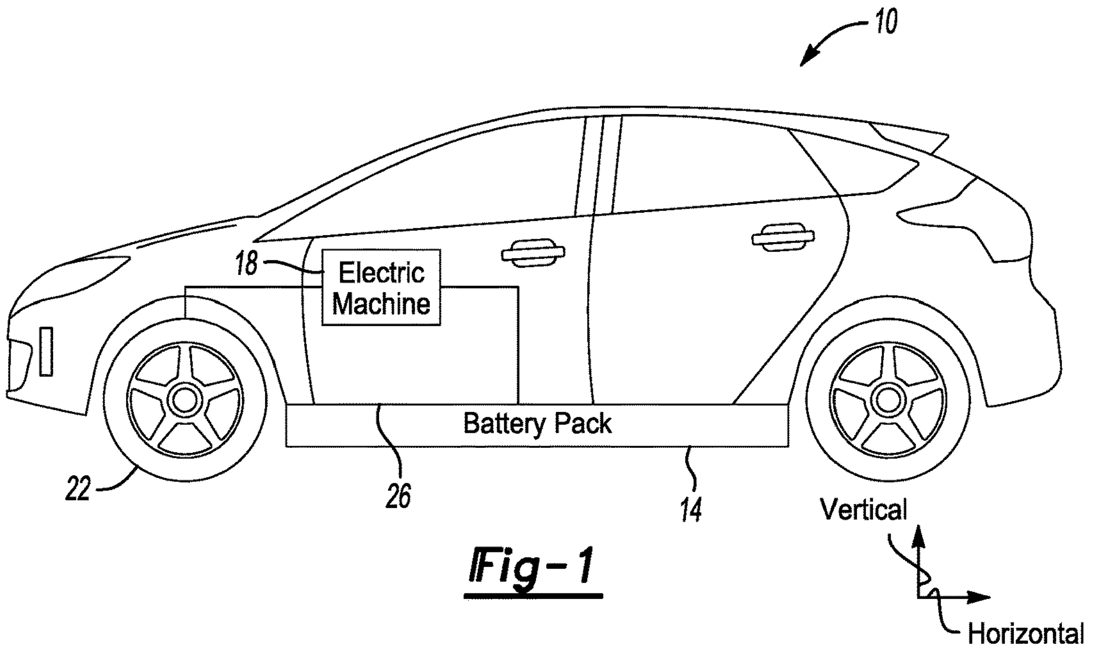
FIG. 1 illustrates a side view of an example electrified vehicle.

With reference to FIG. 1, an electrified vehicle 10 includes a battery pack 14, an electric machine 18, and wheels 22. The battery pack 14 powers an electric machine 18, which can convert electrical power to mechanical power to drive the wheels 22.

The battery pack 14 is, in the exemplary embodiment, secured to an underbody 26 of the electrified vehicle 10. The battery pack 14 could be located elsewhere on the electrified vehicle 10 in other examples.

The electrified vehicle 10 is an all-electric vehicle. In other examples, the electrified vehicle 10 is a hybrid electric vehicle, which selectively drives wheels using torque provided by an internal combustion engine instead of, or in addition to, an electric machine. Generally, the electrified vehicle 10 could be any type of vehicle having a battery pack.

Figure 2:
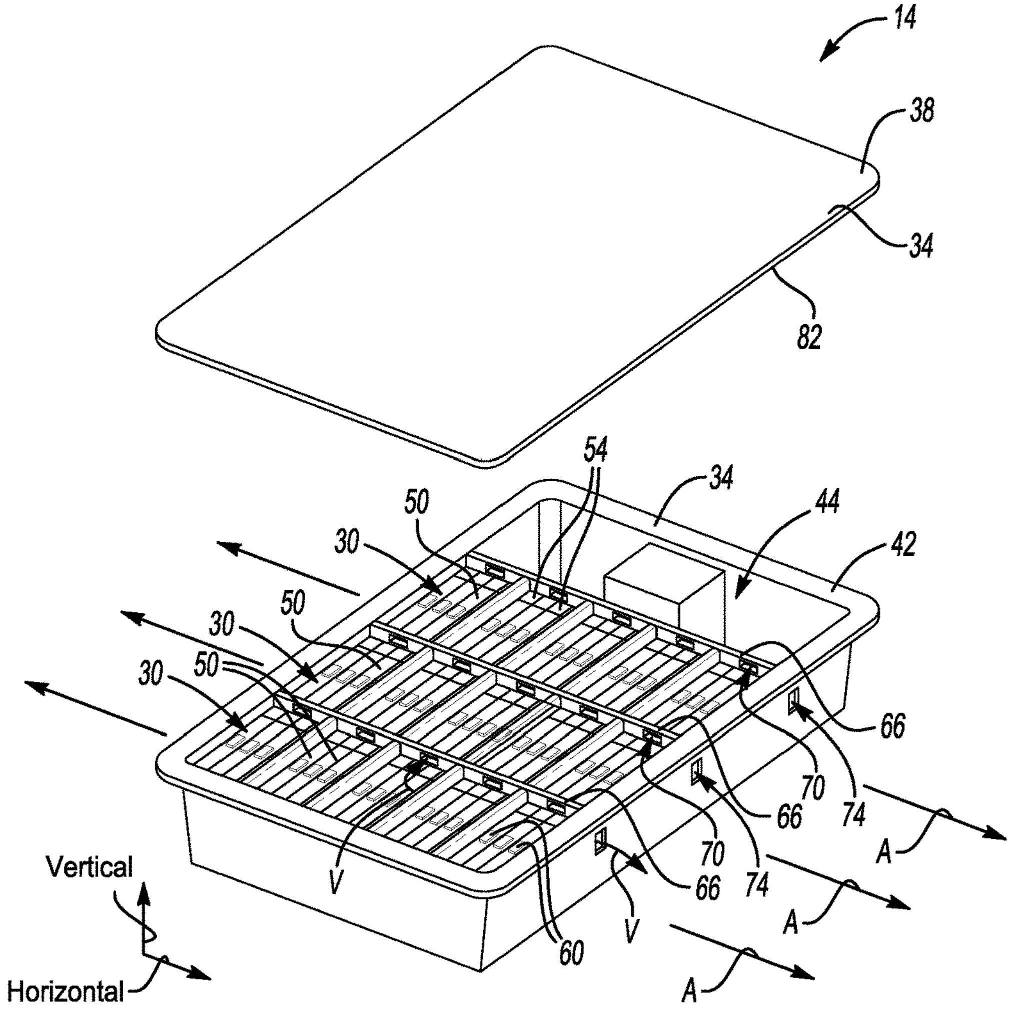
FIG. 2 illustrates an expanded, perspective view of a battery pack from the electrified vehicle of FIG. 1.
Figure 3:
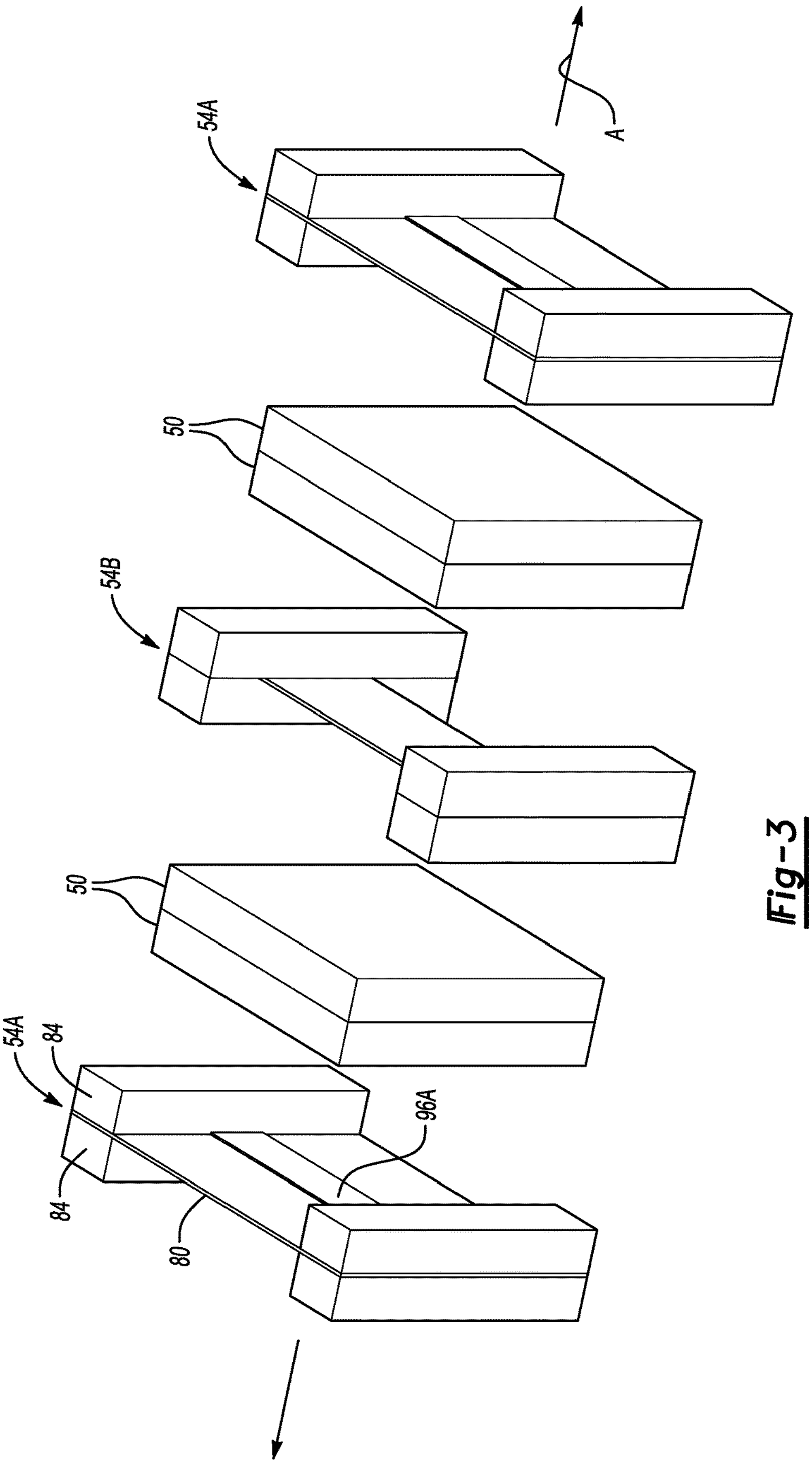
FIG. 3 illustrates an expanded portion of a cell stack from FIG. 2.
Figure 4:
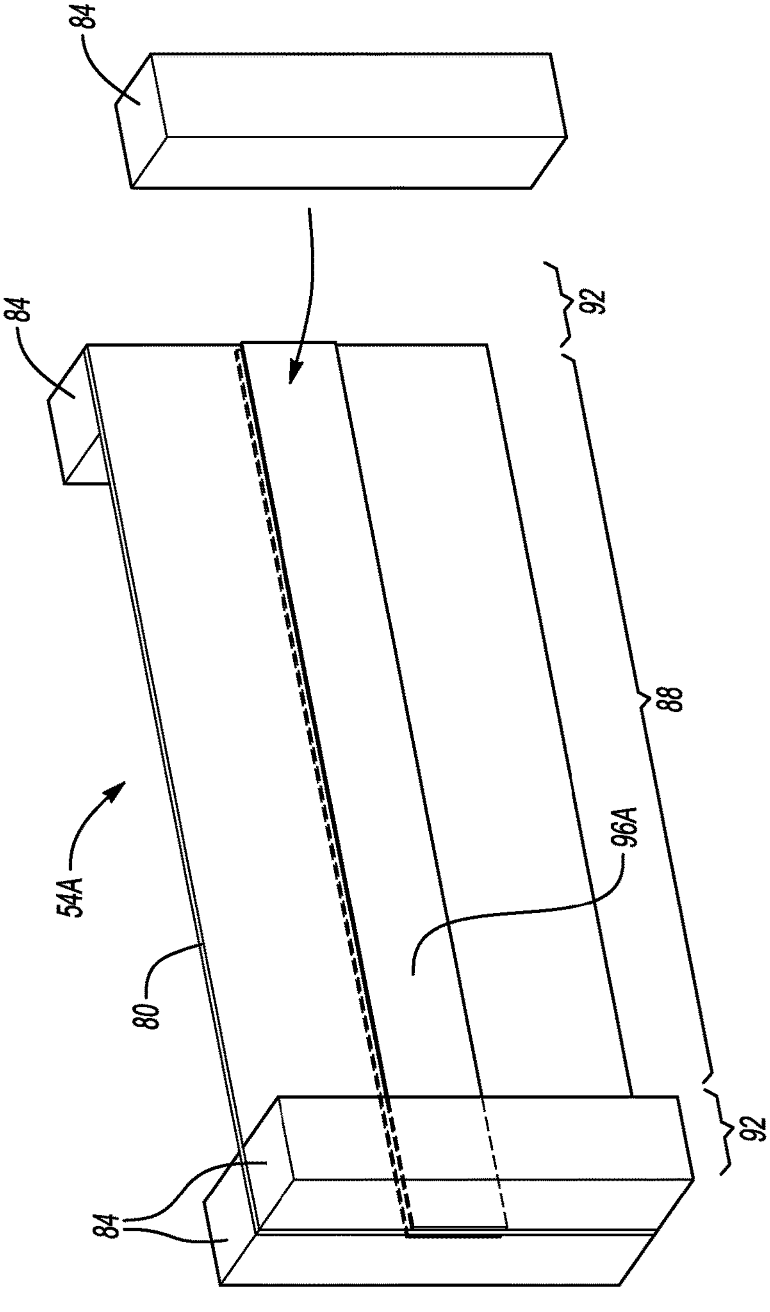
FIGS. 4-6 illustrate views of an example thermal management assembly from the battery pack of FIG. 2.
Figure 5:
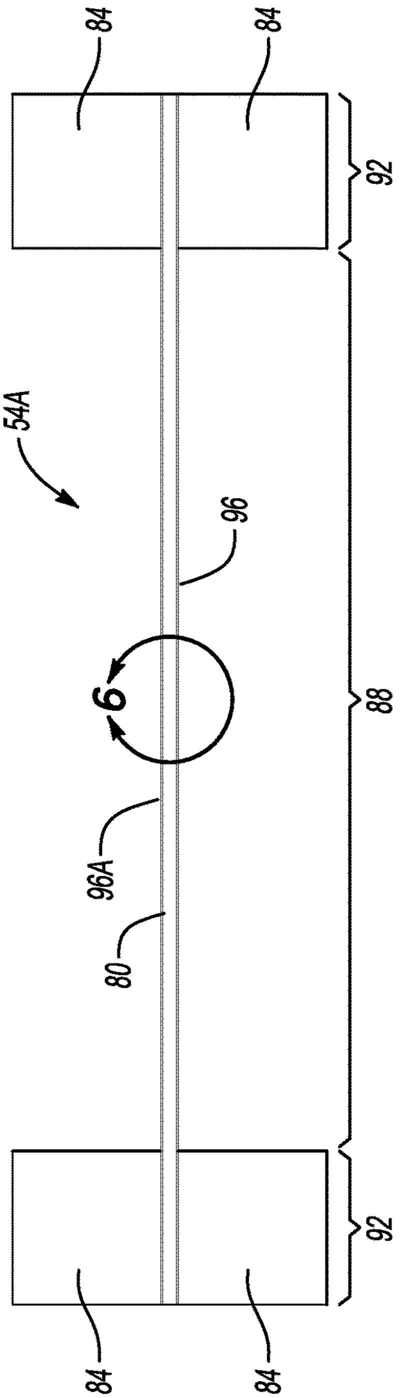
Figure 6:
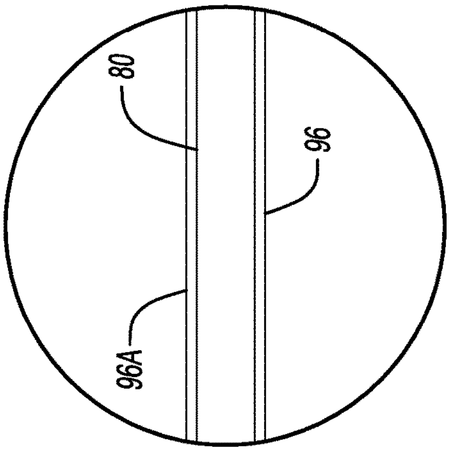
Figure 7:
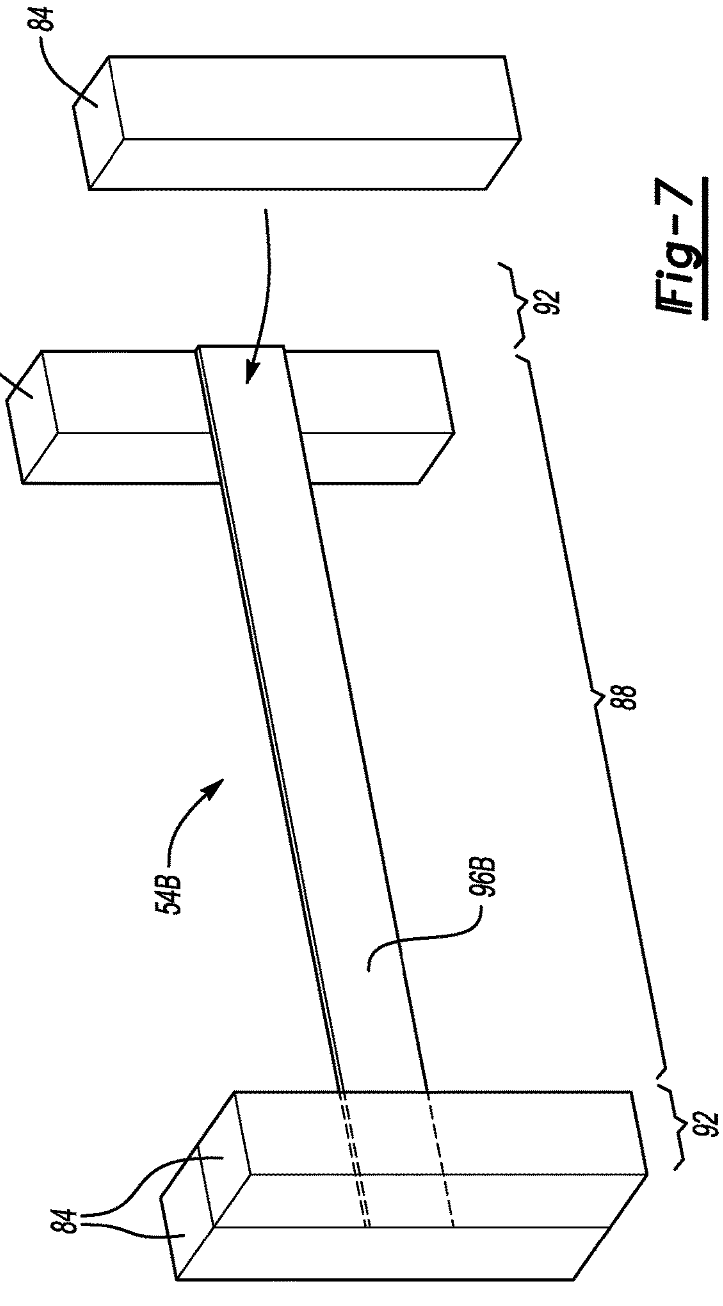
FIGS. 7-9 illustrate views of another example thermal management assembly from the battery pack of FIG. 2.
Figure 8:
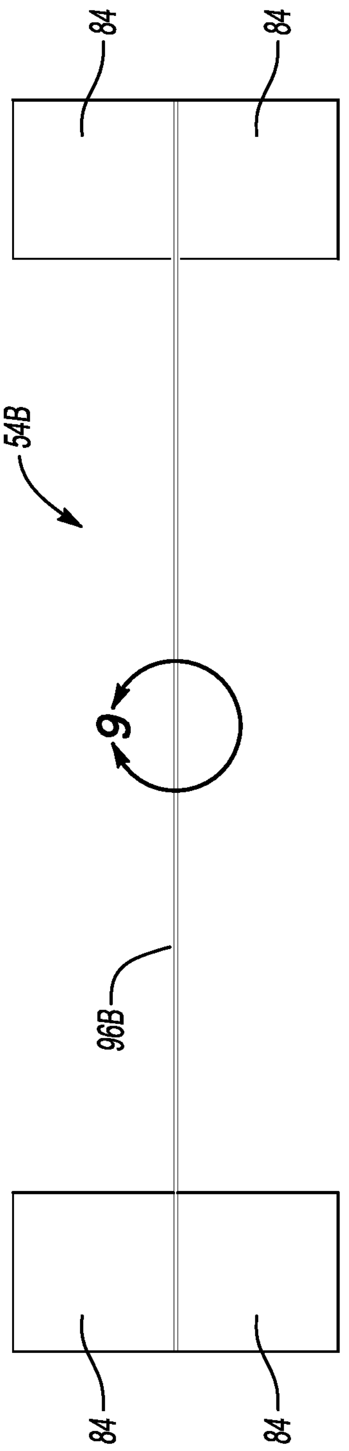
Figure 9:
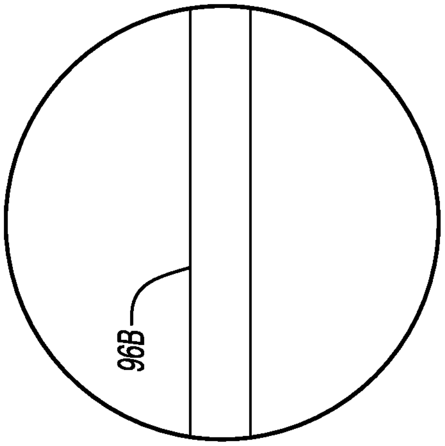

Referring to FIGS. 2 and 3, the battery pack 14 includes a plurality of cell stacks 30 held within an interior of an enclosure assembly 34. In the exemplary embodiment, the enclosure assembly 34 includes an enclosure cover 38 and an enclosure tray 42. The enclosure cover 38 is secured to the enclosure tray 42 to provide an interior area 44 that houses the cell stacks 30. The enclosure cover 38 can be secured to the enclosure tray 42 using mechanical fasteners (not shown), for example.

Each of the cell stacks 30 includes a plurality of battery cells 50 (or simply, "cells") and a plurality of thermal management assemblies 54. Within each of the cell stacks 30, the cells 50 are arranged in groups and disposed along a cell stack axis A. The thermal management assemblies 54 are disposed along the cell stack axis A between groups of the cells 50.

The battery cells 50 store and supply electrical power. Although specific numbers of the cell stacks 30 and cells 50 are illustrated in the various figures of this disclosure, the battery pack 14 could include any number of the cell stacks 30 having any number of individual cells 50. The groups of battery cells 50 can include multiple battery cells 50 or only one battery cell 50.

In an embodiment, the battery cells 50 are lithium-ion pouch-style battery cells. However, battery cells having other geometries (cylindrical, prismatic, etc.) other chemistries (nickel-metal hydride, lead-acid, etc.), or both could alternatively be utilized within the scope of this disclosure.

From time to time, pressure and thermal energy within one or more of the battery cells 50 can increase. The pressure and thermal energy increase can be due to an overcharge condition, for example. The pressure and thermal energy increase can cause the associated battery cell 50 to rupture and expel vent byproducts, such as gas and debris, from within the battery cell 50. The vent byproducts can be released from the associated battery cell 50 through a designated vent 60 within the housing, such as a membrane that yields in response to increased pressure, or through a ruptured area of the associated battery cell 50.

The vent byproducts can have relatively high thermal energy levels. Guiding the vent byproducts away from other battery cells 50 that are not venting can prevent those battery cells 50 from venting and the venting event cascading through the battery pack 14.

The battery pack 14, in these examples, includes cross-member assemblies 66 disposed between cell stacks 30. The cross-member assemblies 66 include venting passageways and openings 70 to the venting passageways. Vent byproducts vented through the vent 60 of one or more of the battery cells 50 can move through at least one of the openings 70 into venting passageway. The gas and debris are communicated though the venting passageway through an enclosure vent 74 to an area outside the battery pack 14.

The openings 70, the enclosure vent 74, or both can be covered by respective membranes, for example, when venting is not needed. During venting, the vent byproducts can rupture the membranes so that the vent byproducts can flow from the battery cells 50, through the openings 70 to the venting passageway and then through the enclosure vent 74. The example cross-member assemblies 66 extend longitudinally in a direction that is parallel to the cell stack axes A. The cross-member assemblies 66 and the cell stack axes A extend in a cross-vehicle direction (i.e., from a driver side to a passenger side).

The thermal management assemblies 54 can help to direct vent byproducts outward relative to the respective cell stack axis A into the venting passageways within the cross-member assemblies 66. The thermal management assemblies 54 can help to block movement of vent byproducts from one group of the battery cells 50 to another group of the battery cells 50. Thus, thermal energy associated with the vent byproducts is prevented from heating battery cells 50 in other groups and causing those battery cells 50 to vent.

With reference now to FIGS. 4-9 and continuing reference to FIGS. 2 and 3, the example battery pack 14 includes a first type of thermal management assembly 54A (FIGS. 4-6) and a second type of thermal management assembly 54B. The thermal management assemblies 54A separate and compartmentalize groups of battery cells 50. The thermal management assemblies 54B are disposed between battery cells 50 of the groups.

The thermal management assemblies 54A, include a thermal barrier 80 and plurality of thermal blockers 84. The thermal barrier 80 includes a sandwiched region 88 and at least one projecting region 92. Within the cell stack 30, the sandwiched region 88 is sandwiched and compressed axially between the cells 50, and the at least one projecting region 92 is disposed outboard of the sandwiched region 88 relative to the cell stack axis A.

In the exemplary embodiment, the thermal blockers 84 are secured to opposing axial sides of the projecting region 92 on a first outboard side of the cell stack 30, and to opposing axial side of the projecting region 92 on an opposite, second outboard side of the cell stack 30.

In this example, two projecting regions 92 are used to support thermal blockers 84 on opposite sides for of the cell stack 30. In other examples, the thermal management assembly could include a single projecting region on one horizontal side of the cell stack 30.

Further, in another example, the thermal barriers 80 could instead or additionally be supported by at least one projecting region 92 that is vertically above or below the cells 50. Vertical and horizontal, for purposes of this disclosure, are with reference to ground and an orientation of the vehicle 10 during ordinary operation.

In this example, the thermal barriers 80 are mica-based sheets. In other examples, the thermal barriers 80 could be an aerogel sheets, or a sheet having some other thermally insulative material or combination of thermally insulative materials. The thermal barrier 80 can extend to contact the enclosure assembly 34 and cross-member assemblies 66 to effectively compartmentalize groups of the battery cells 50.

An adhesive can be used to secure the thermal blockers 84 to the projecting regions 92 of the thermal barrier 80. In this example, the adhesive is a piece of adhesive tape 96A. The thermal management assembly 54A includes a piece of double-sided adhesive tape 96A on a first axial side of the thermal barrier 80, and a piece of adhesive tape 96A on an opposite, second axial side of the thermal barrier 80. The pieces of adhesive tape 96A on each axial side of the thermal barrier 80 span from the projecting region 92 on a first outboard side to the projecting region 92 on an opposite, second outboard side. In this example, the thermal barrier 80 along with the pieces of adhesive tape 96A provide a base assembly for the thermal management assembly 54A.

The thermal blockers 84 are secured to the projecting regions 92 of the thermal barrier 80 with areas of the adhesive tape 96A that are located on the projecting regions 92. Remaining areas of the adhesive tape 96A that are within the sandwiched region 88 help to bond the battery cells 50 to the thermal barrier 80. The thermal blockers 84 are foam in this example.

The thermal management assembly 54B includes the projecting regions 92 and the sandwiched region 88, but omits the thermal barrier 80. The thermal management assembly 54B includes a piece of adhesive tape 96B and a plurality of the thermal blockers 84 secured to the adhesive tape 96B in the projecting regions 92. Within the sandwiched region, the piece of adhesive tape 96B is used to secure one of the battery cells 50 in the cell stack 30 to an axially adjacent battery cell 50 in the cell stack 30. The adhesive tape 96B alone provides a base assembly for the example thermal management assembly 54B. That is, the base assembly is provided entirely by the adhesive tape 96B in the thermal management assembly 54B.

After assembling the cell stacks 30, the cell stacks 30 include thermal blockers 84 along opposing outboard sides of the cell stacks 30. The battery cells 50 can include tab terminals (not shown) that extend outboard between axially adjacent thermal blockers 84 to connect to one or more busbar assemblies.

Features of the disclosed examples include thermal management assemblies that include a plurality of thermal blockers. This can facilitate assembly as individually placing thermal blockers within the battery pack may not be required.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A traction battery pack assembly, comprising:

an enclosure assembly that provides an interior area;

a cell stack within the interior area, the cell stack having a plurality of battery cells disposed along a cell stack axis; and a thermal management assembly disposed along the cell stack axis, the thermal management assembly including a plurality of thermal blockers secured to a base assembly, the base assembly including a sandwiched region and at least one projecting region, the sandwiched region disposed along the cell stack axis and sandwiched between first and second battery cells, the at least one projecting region outboard of the sandwiched region relative to the cell stack axis, the plurality of thermal blockers secured to the at least one projecting region of the base assembly, wherein the plurality of thermal blockers include thermal blockers secured to opposing axial sides of the at least one projecting region on a first outboard side of the cell stack.

2. The traction battery pack assembly of claim 1, wherein the plurality of battery cells comprise a plurality of pouch-style battery cells.

3. The traction battery pack assembly of claim 1, wherein the plurality of thermal blockers further includes thermal blockers secured to opposing axial sides of the at least one projecting region on an opposite, second outboard side of the cell stack.

4. The traction battery pack assembly of claim 1, further comprising an adhesive that secures the plurality of thermal blockers to the at least one projecting region of the base assembly.

5. The traction battery pack assembly of claim 4, wherein the adhesive is an adhesive tape.

6. A traction battery pack assembly, comprising:

an enclosure assembly that provides an interior area;

a cell stack within the interior area, the cell stack having a plurality of battery cells disposed along a cell stack axis;

a thermal management assembly disposed along the cell stack axis, the thermal management assembly including a plurality of thermal blockers secured to a base assembly, the base assembly including a sandwiched region and at least one projecting region, the sandwiched region disposed along the cell stack axis and sandwiched between first and second battery cells, the at least one projecting region outboard of the sandwiched region relative to the cell stack axis, the plurality of thermal blockers secured to the at least one projecting region of the base assembly; and an adhesive tape that secures the plurality of thermal blockers to the at least one projecting region of the base assembly, wherein the base assembly includes a thermal barrier, the adhesive tape including a first piece of tape on a first axial side of the thermal barrier, and a second piece of tape on an opposite, second axial side of the thermal barrier.

7. The traction battery pack assembly of claim 6, wherein the first piece of tape secures at least one thermal blocker from the plurality of thermal blockers to the at least one projecting region on a first outboard side of the cell stack, and secures at least one other thermal blocker from the plurality of thermal blockers to the at least one projecting region on an opposite second outboard side of the cell stack.

8. The traction battery pack assembly of claim 1, wherein the base assembly is provided entirely by an adhesive tape.

9. The traction battery pack assembly of claim 1, wherein the thermal management assembly is configured to block vent byproducts expelled from one or more battery cells on a first axial side of the thermal management assembly from moving adjacent battery cells on an opposite, second axial side of the thermal management assembly.

10. The traction battery pack assembly of claim 1, wherein the base assembly is a first material, and the plurality of thermal blockers are a second, different material.

11. The traction battery pack assembly of claim 1, wherein the plurality of thermal blockers are foam.

12. The traction battery pack assembly of claim 1, wherein the base assembly comprises mica.

13. A method of managing battery pack thermal energy, comprising:

within an enclosure assembly, supporting a plurality of thermal blockers that are disposed at opposing sides of a cell stack using a base assembly of a thermal management assembly, the base assembly at least partially sandwiched between a first and a second battery cell of the cell stack, wherein the plurality of thermal blockers are positioned outside the first and second battery cells and secured to opposing axial sides of the base assembly.

14. The method of managing battery pack thermal energy of claim 13, further comprising adhesively securing the plurality of thermal blockers to the base assembly.

15. The method of managing battery pack thermal energy of claim 14, further comprising securing at least some of the thermal blockers within the plurality of thermal blockers to a first axial side of the base assembly using adhesive tape.

16. The method of managing battery pack thermal energy of claim 15, further comprising securing the first battery cell to the first axial side of the base assembly using the adhesive tape.

17. The method of managing battery pack thermal energy of claim 16, further comprising securing at least some of the thermal blockers within the plurality of thermal blockers to an opposite second side of the base assembly using adhesive tape.

18. The method of managing battery pack thermal energy of claim 13, wherein the base assembly is an adhesive tape.

19. The method of managing battery pack thermal energy of claim 13, wherein the base assembly is compressed axially between the first and second battery cells and directly contacts both the first and second battery cells.

20. The method of managing battery pack thermal energy of claim 13, wherein the enclosure assembly includes a cross-member assembly that provides a venting passageway, the method further comprising directing vent byproducts expelled from one of the first and second battery cells into the venting passageway using the thermal management assembly.

* * * * *